United States Patent [19]

Verdier et al.

[11] Patent Number: 4,599,529

[45] Date of Patent: Jul. 8, 1986

[54] FUNCTIONAL UNIT FOR A MOTORIZED ELECTRICAL APPLIANCE

[75] Inventors: Alain Verdier, Ste Foy les Lyon; Marc Polly, Villeurbanne, both of France

[73] Assignee: Black & Decker Inc., Newark, Del.

[21] Appl. No.: 646,910

[22] Filed: Aug. 31, 1984

[30] Foreign Application Priority Data

Sep. 9, 1983 [FR] France ................. 83 11420

[51] Int. Cl.⁴ .............................................. H02K 7/00
[52] U.S. Cl. .................................. 310/50; 310/68 R; 310/89
[58] Field of Search ............ 310/47, 50, 239, 89, 310/68, 71, 83

[56] References Cited

U.S. PATENT DOCUMENTS

| | | | |
|---|---|---|---|
| 3,257,599 | 6/1966 | Somers et al. | |
| 3,694,680 | 9/1972 | Jacyno | 310/50 |
| 3,700,940 | 10/1972 | Sigl | |
| 3,710,154 | 1/1973 | Schilling | 310/50 |
| 3,973,179 | 8/1976 | Weber | 310/50 X |
| 4,005,320 | 1/1977 | Mabuchi | 310/89 X |
| 4,092,581 | 5/1978 | Ascoli | 310/239 X |
| 4,164,670 | 8/1979 | Maher | 310/89 X |
| 4,209,875 | 7/1980 | Pugh et al. | |
| 4,218,806 | 8/1980 | Cohn | |

FOREIGN PATENT DOCUMENTS

903089 9/1945 France .
2028025 2/1980 United Kingdom .

OTHER PUBLICATIONS

French Search Report, 5-25-84.

*Primary Examiner*—Donovan F. Duggan
*Attorney, Agent, or Firm*—Ronald B. Sherer; Edward D. Murphy; Harold Weinstein

[57] ABSTRACT

A functional unit for a motorized electrical appliance consists of a supporting block, an electric motor, power take-off means and means for supplying electric current to the motor. The various elements are assembled on the supporting block and therewith comprise a readily assembled, low cost sub-assembly adapted for use in a variety of appliances.

A method of assembling the functional unit and the application of the unit to a hand-held cordless vacuum cleaner are also disclosed.

18 Claims, 2 Drawing Figures

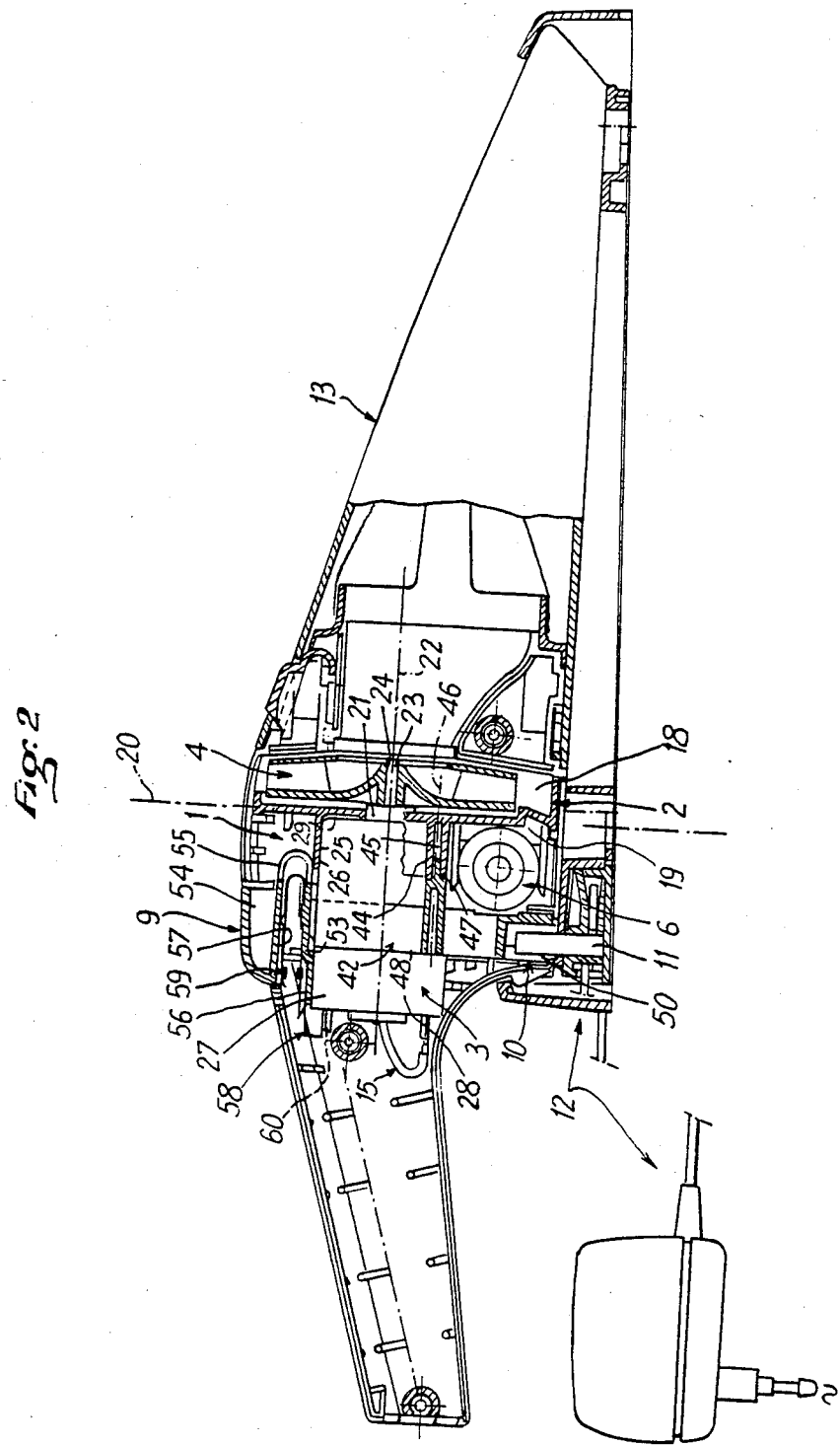

FUNCTIONAL UNIT FOR A MOTORIZED ELECTRICAL APPLIANCE

BACKGROUND AND SUMMARY OF THE INVENTION

The present invention relates to motorized electrical appliances such as vacuum cleaners, coffee grinders and electric drills, especially, but not exclusively, of a portable type.

In the traditional design of such appliances, the various functional components, such as, for example, the electric motor, batteries (where a cordless appliance is concerned), the circuit supplying the motor with electricity and, in particular, the on/off switch comprise separate sub-assemblies, at least some of which often constitute elements of the appliance body. These sub-assemblies are not connected up until the assembly of the appliance is completed. Such an assembly method necessitates substantial handling of parts and sub-assemblies and allows the appliance to be tested only when assembly has been completed. Testing after completion of asssembly is difficult and results in the necessity of dismantling and subsequently reassembling appliances wherein defects are detected. A similar disadvantage is encountered with respect to any post-sale maintenance.

It is, therefore, an object of the present invention to provide an improved method of assembly for motorized electrical appliances wherein the various component sub-assemblies may be tested, with respect to the interaction between them, under conditions of optimum accessability.

It is another object to provide a more economical assembly method of the character aforesaid.

It is yet another object to provide an assembly method facilitating the production of various different types and models of appliances from standardized components.

The foregoing and other objects and advantages of the invention as may hereinafter appear are achieved by the assembly of the various component sub-assemblies of the appliance, such as the motor and the power take-off means, onto a supporting block to form a functional unit. Only after assembly and testing are complete is the functional unit inserted into the appliance body, which functions merely as a cover. Advantageously, the various components of the functional unit are assembled onto the supporting block by simple translational motions and snap together or are retained by press fitment.

Other characteristics and advantages of the invention will emerge from the following description of a preferred embodiment and from the attached drawings which form an integral part of this description.

DESCRIPTION OF THE DRAWINGS

FIG. 2, which shows the unit of FIG. 1 in place in a vacuum cleaner, is a sectional view essentially along a plane of pseudosymmety of the vacuum cleaner which passes through the axis of the motor, and partially in section along other planes parallel to this plane.

DESCRIPTION OF THE PREFERRED EMBODIMENT

Figure 1:
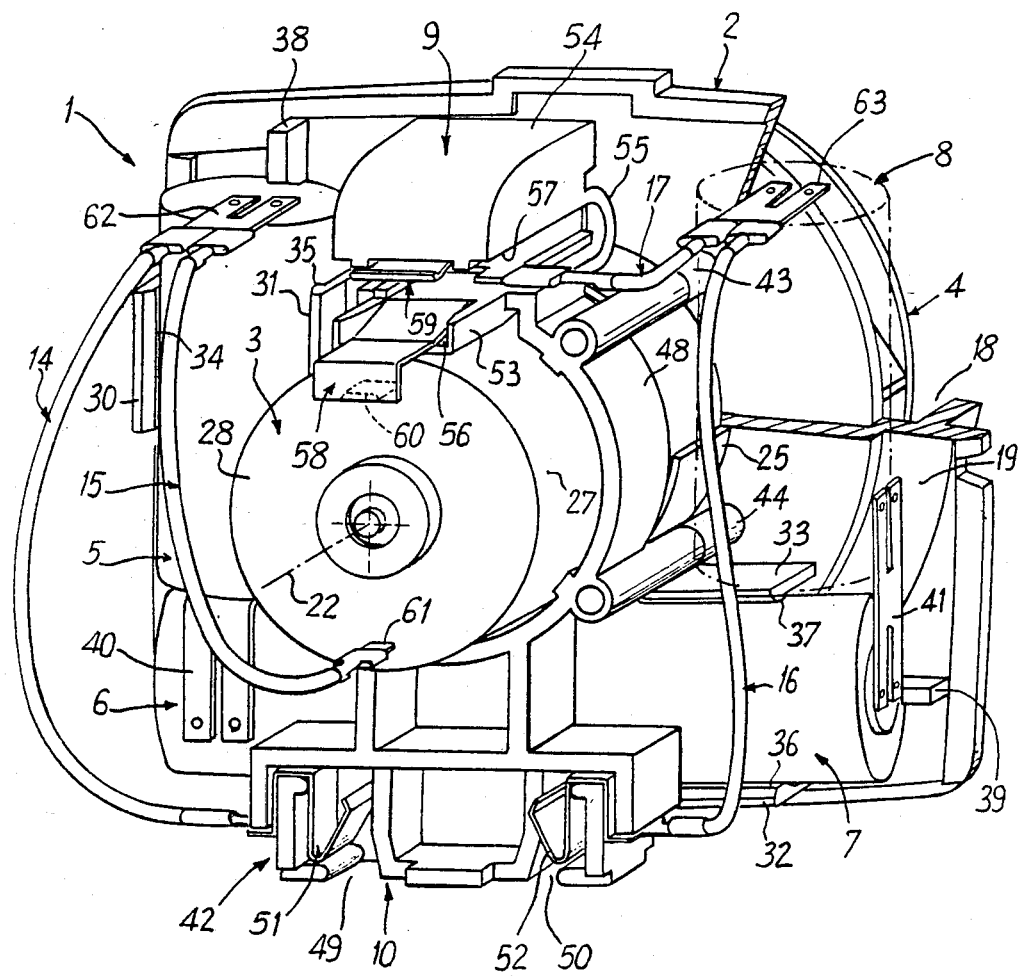
FIG. 1 is a perspective view, partially in section, of the functional unit of the present invention.

As shown in FIG. 1, the functional unit 1, specifically arranged for use in a cordless vacuum cleaner, comprises a supporting block 2; an electric motor 3; a suction turbine 4 carried on the motor 3; means for supplying the motor 3 with electricity, namely four rechargeable batteries, denoted respectively by reference numerals 5 to 8, connected in series; an on/off switch 9; a socket 10 for connection to the output pins 11 of a battery charging unit 12; and 4 cables denoted respectively by reference numerals 14 to 17, connecting the batteries 5-8 to socket 10 on the one hand (cables 14 and 16) and to on/off switch 9 and motor 3 on the other hand (cables 15 and 17).

It is to be noted that all of the components of the vacuum cleaner which need to be tested during production are combined in this unit 1, with the advantage of easy access for testing of these components at the time of production. These components may then be conveniently inserted into the vacuum cleaner body 13 in a single operation and retained there by engagement between body 13 and supporting block 2.

Supporting block 2, advantageously molded in one piece of an electrically insulating plastic, has a generally flat shape defined, by two parallel faces, front face 18 and rear face 19.

Of the various above-mentioned components grouped into functional unit 1, only turbine 4 is intended to be placed opposite face 18 of supporting block 2, and this face can advantageously have any matching relief designed to improve the operating conditions of turbine 4. The other components, namely motor 3, batteries 5 to 8, on/off switch 9, socket 10 and cables 14 to 17 are carried by supporting block 2 opposite rear face 19 of supporting block 2. Supporting block 2 has a through bore 21. An output shaft 23 of motor 3 passes coaxially through bore 21 and is force-fitted into an orifice 24 in turbine 4. Motor 3 is retained on supporting block 2 by frictional engagement with an integral, cylindrical sleeve 25 which projects from face 19 around bore 21 and has an inner peripheral face 26 with a diameter approximate to that of the outer peripheral face 27 of the housing 28 of motor 3. It is noted that the diameter of face 26 is greater than that of bore 21, so that there exists on rear face 19 of supporting block 2, an annular face or collar 29 which serves as an abutment for housing 28. Thus, motor 3 can be conveniently mounted on supporting block 2 by being aligned such that output shaft 23 is coaxial with bore 21, in a direction going from rear face 19 to front face 18, and subsequently being moved in this direction relative to supporting block 2, thus entering sleeve 25, until housing 28 abuts collar 29. Advantageously, this installation of motor 3 on supporting block 2 is accompanied by the introduction of output shaft 23 into orifice 24 of turbine 4, which has previously been placed opposite front face 18 of supporting block 2 in position in which hole 24 is centered on the axis 22 of bore 21. It will be understood that in this way it is possible to install motor 3 by simply allowing it to descend under the influence of gravity into sleeve 25 and then exerting a force to bring it into abuttment with collar 29. Sleeve 25 advantageously includes reliefs which define face 26.

Each of batteries 5,6,7 and 8 can be mounted by means of a similar movement relative to supporting block 2, being snapped in place between a pair of lugs integrally formed in rear face 19 of supporting block 2. Only lugs 30 and 31, thus receiving battery 5, and lugs 32 and 33, thus receiving battery 7, can be seen in the drawing, but similar pairs of lugs are provided to receive batteries 6 and 8. Both lugs of a pair are flat and approximately parallel to one another, but each of them has a distal inwardly facing rib such as 34, 35, 36 and 37 respectively. The dimensions of each pair of lugs are such that movement of a battery toward rear face 19 of supporting block 2 in a direction parallel to axis 22 elastically spreads the paired lugs until the battery abuts supporting block 2, whereupon the lugs return to their initial position securely gripping the battery. In order to limit movement of the batteries to a direction parallel to axis 22, projections, such as 38 and 39, are provided on rear face 19 of supporting block 2.

It is to be noted that the particular U-shaped arrangement of the four batteries 5 to 8 permits two of them (6 and 7) to be connected in series by direct mutual contact between their ends. The other two batteries (5 and 8 respectively) are disposed perpendicular to the first two, adjacent to the free end of each of the first mentioned batteries, thus making it possible to connect them in series by means of simple soldering electrically conductive bridges 40 and 41 which are advantageously fitted immediately after the batteries have been mounted on the supporting block.

When functional unit 1 is assembled, the installation of batteries 5 to 8 and bridges 40, 41 precedes the installation, on rear face 19 of support 2, of a separate piece 42 formed of an electrically insulating plastic and grouping together on/off switch 9 and socket 10.

In order to mount piece 42 on supporting block 2 a number of props, two of which can be seen in the drawing where they are denoted respectively by reference numerals 43 and 44, are integrally formed on rear face 19 of block 2. In the example illustrated there are four of them, these four being disposed parallel to axis 22 and uniformly distributed about sleeve 25.

As shown more particularly in FIG. 2 with respect to prop 44, each of these props includes a cylindrical recess such as 45 adapted to receive a matching stud, such as 47, carried by piece 42, which guides movement of the latter as it is installed on supporting block 2.

Between the studs, piece 42 has the form of a sleeve 48 designed to encase outer peripheral face 27 of housing 28 of motor 3 coaxially and with a play which is sufficiently large to allow free relative coaxial sliding but sufficiently small nevertheless to ensure coaxiality during such sliding. Motor 3 is advantageously installed on supporting block 2, as described above, after first batteries 5 to 8 and then piece 42 have been installed in succession. Piece 42 thus serves as a means of guiding motor 3 relative to supporting block 2, in a direction parallel to axis 22 and ensuring that output shaft 23 is coaxial with the latter.

Switch 9 and socket 10 are disposed at diametrically opposed points on sleeve 48.

Socket 10 comprises two slides 49 and 50, formed in sleeve 48, and metal strips 51 and 52 designed to make electrical contact with a pin, such as pin 11, engaged in the corresponding slide when the batteries are to be recharged. Metal strips 50 and 51 can be inserted between suitable reliefs, formed in piece 42, either before or after the latter has been mounted on supporting block 2. Advantageously, the above-mentioned reliefs are arranged in such a way that insertion of strips 50 and 51 is carried out by simple translational movement relative to piece 42.

Switch 9 comprises, integrally formed on piece 42, a push button 54 elastically connected to a zone 53 of sleeve 48 by bridges of material 55. Parts 53 and 54 have plane faces 56 and 57 respectively, which are approximately parallel to axis 22 and are spaced apart from one another when part 54 is in its relaxed position. Part 54 can be brought by finger pressure into a position in which face 57 converges towards face 56. Face 56 and face 57 are covered by metal strips 58 and 59 respectively, which are normally apart and electrically insulated from one another but which come in contact with one another to make an electrical connection when part 54 is pressed.

Advantageously, bridges 55 are located adjacent rear face 19 of supporting block 2 when functional unit 1 is assembled, such that strips 58 and 59 can be installed, after piece 42 has been mounted on supporting block 2, by a simple translational motion parallel to axis 22.

The tag end of strip 58 is snapped onto one of the terminals 60 and 61 (here terminal 60) supplying motor 3 with electricity. Terminals 60 and 61 are located at the end of motor 3 opposite that from which output shaft 23 projects and take the form of pins parallel to said shaft. Thus when piece 42 is mounted on supporting block 2 electrical connection between strip 58 and terminal 60 can be made in a particularly direct and convenient way.

Strip 59 is advantageously U-shaped, being defined by two branches of unequal length which are connected by a rounded part tending to move them apart elastically. The longer of the two branches is intended to contact face 57, while the shorter lies along face 56, but does not contact strip 58.

The rounded part of strip 59 is thus adjacent bridges 55. Faces 56 and 57 have reliefs into which the two branches snap elastically when strip 59 is installed.

A particularly advantageous method of assembling functional unit 1 comprises the following steps:
1. turbine 4 is placed on a horizontal assembly jig;
2. supporting block 2 is coaxially placed on turbine 4 with axis 22 vertical and rear face 19 turned upwards.
3. batteries 5 to 8 are placed on supporting block 2 and snapped in place by being pushed vertically downwards;
4. bridges 40 and 41 are soldered, a double pin 62 is soldered to battery 5 and is similar double pin 63 is soldered to battery 8;
5. piece 42 is placed on supporting block 2 and then, by means of a push exerted vertically downwards, locked in place;
6. strips 51 and 52 are installed on piece 42 by means of movements identical to those for mounting piece 42 on supporting block 2;
7. motor 3 is placed on supporting block 2 and pressed into fitment;
8. strips 59 and 58 are installed in succession by being inserted between faces 57 and 56 from the top downwards until they snap into place.

It should be noted that the soldering of bridges 40 and 41 and of pins 62 and 63, and the installation of strips 51 and 52 and of strips 59 and 58, with the exception of the snapping of the latter onto terminal 60 of motor 2, could be carried out in a different order in relation to the other steps. Moreover, it is optional to place turbine 4 on the assembly jig beforehand, since turbine 4 can be installed after motor 3 has been mounted on supporting block 2.

The final operation for assembling functional unit 1 involves installing cables 14 to 17, of which the first connects terminal 62 to strip 51, the second connects the same terminal 62 to second terminal 61 of motor 3, the third connects terminal 63 to strip 52 and the fourth connects the same terminal 63 to strip 59. Functional unit 1 can now be tested, before being mounted within the body of vacuum cleaner 13 which body is provided with carefully arranged orifices to allow access to slides 49 and 40 and to on/off switch 9.

It will be noted that the assembly of the various functional components of the vacuum cleaner in the form of functional unit 1 is associated with a particularly short length of the electrical connecting circuits, this being especially useful in a battery-operated appliance.

It will also be noted that a single supporting block 2 can be used for very different items of equipment which make use of motors of different powers, inasmuch as, if the motor used has a lower consumption than that for which the four-battery arrangement just described has been provided, batteries 5 and 8 can easily be omitted, in which case double pins 62 and 63 are placed in the same position as bridges 40 and 41 have been placed.

We claim:

1. A functional unit for an electrical appliance, comprising:
   a support block having forward and rear faces, an aperture extending through said faces and defining an axis transverse to said faces;
   an electric motor having a rotatable output shaft extending along said axis forwardly through said aperture to beyond said front face;
   a driven member mounted on said shaft forwardly of said front face for rotation by said shaft;
   means, connected to said block and extending rearwardly from said rear face, for mounting said motor to said rear face;
   at least one rechargeable battery;
   means, connected to said block and extending rearwardly from said rear face on opposite sides of said battery, for securing said battery to said rear face;
   a ring-like piece secured to said block and encircling said motor;
   said motor mounting means being disposed between said rear face and said ring-like piece, and said motor being a press fit through said ring-like piece into said motor mounting means;
   switch means, mounted on said ring-like piece, for electrically connecting said battery to said motor to energize the latter; and
   socket means, also mounted on said ring-like piece, for connection to an external source of electrical supply for recharging said battery;
   whereby said functional unit is structurally independent of said electrical appliance and can be functionally tested before said functional unit is mounted in said electrical appliance.

2. The functional unit of claim 1, wherein said means for securing said battery comprises a pair of lugs extending rearwardly from said rear face.

3. The functional unit of claim 2, wherein said lugs are flat, parallel to each other, and have ribs at free rear ends thereof, said free ends being resiliently movable apart to enable insertion of said battery between said lugs in a direction parallel to said axis, said ribs retaining said battery once inserted.

4. The functional unit of claim 2, wherein there is a plurality of rechargeable batteries, each secured to said rear face by a separate pair of said lugs, and said batteries are disposed in series arrangement around said motor, said switch means being physically located between a first battery and a last battery of said series arrangement.

5. The functional unit of claim 1, wherein said means for mounting said motor comprises a sleeve integral with said block and frictionally engaging around said motor.

6. The functional unit of claim 1, wherein said ring-like piece comprises a sleeve abutting a rear end of said motor mounting means and secured to said rear face by securing elements disposed parallel to said axis and axially engaged.

7. The functional unit of claim 1, wherein:
   said switch means and said socket means are disposed on opposite sides of said axis;
   said socket means comprises a pair of metal strip contacts;
   said switch means comprises a push button elastically connected to said ring-like piece by U-shaped bridges, a metal strip contact engaged in said button and movable towards said axis to contact another metal strip contact engaged in said ring-like member and electrically connected to said motor; and
   all said metal strips contact being located in cavities extending parallel to said axis and being open at ends directed away from said rear face.

8. A functional unit for an electric appliance, comprising:
   an electric motor defining a longitudinal axis and having an output shaft extending from a forward end along said axis;
   a support block having forward and rear faces extending transversely to said axis;
   a sleeve integral with said support block and extending rearwardly from said rear face;
   an element fastened to said support block and abutting a rear end of said sleeve, said element encasing said motor;
   an on/off switch for said motor mounted on said element;
   said motor being a sliding fit through said element and a press fit in said sleeve, with said output shaft extending forwardly through an aperture in said forward face;
   a driven member secured on said output shaft forward of but adjacent said forward face for rotation by said shaft;
   battery means for storing electrical power and for supplying said electrical power to said motor via said on/off switch;
   means for securing said battery means to said rear face adjacent said motor but radially outwardly of said motor with respect to said axis; and
   said element having a part extending radially outwardly with respect to said axis, at least a portion of said battery means being disposed between said part and said rear face.

9. The functional unit of claim 8, wherein said securing means comprises a pair of lugs extending rearwardly from said rear face, rear ends of said lugs being resiliently displaceable away from each other in a direction transverse to said axis.

10. The functional unit of claim 8, wherein said battery means comprises at least one rechargeable battery.

11. The functional unit of claim 10, wherein said battery is of cylindrical shape and has a central axis disposed perpendicular to said axis.

12. The functional unit of claim 8, wherein said battery means comprises a plurality of rechargeable batteries disposed around said motor, each said battery having a longitudinal axis spaced radially outwardly from and perpendicular to said motor axis.

13. The functional unit of claim 8, wherein said element has a plurality of studs extending parallel to said axis and engaged in a plurality of recesses in said support block.

14. The functional unit of claim 13, wherein said battery means comprises a rechargeable battery, and said element is ring-like, and said extending part of the latter comprises a recharging socket electrically connected to said rechargeable battery for recharging the latter.

15. The functional unit of claim 8, wherein said support block is made of electrically insulating plastic material and has a generally flat shape defined by said forward and rear faces, said forward and rear faces being parallel and perpendicular to said axis.

16. An electrical appliance, comprising:
a housing;
a functional unit mounted in said housing;
said functional unit being structurally independent of said housing and comprising a support block, an electric motor, a rotatable driven member, a plurality of rechargeable batteries, and a ring-like member;
said rotatable driven member being a press fit on an extension of an output shaft of said motor, said extension extending through an aperture in said support block with said motor on a rear side of said block and said driven member on a forward side of said block;
a sleeve extending rearwardly from said rear side;
said ring-like member abutting a rear end of said sleeve and being secured by fasteners to said block;
said motor extending through said ring-like member and being frictionally engaged in said sleeve with a forward end of said motor abutting said rear side of said block;
said ring-like member having mounted thereon an on/off switch for said motor, said switch having a resiliently mounted actuating button depressable towards said ring-like member for actuation of said switch, said button extending through an orifice in said housing;
said batteries being mounted on said rear side of said block around said sleeve and being electrically connected in series to said motor via said switch, each battery being held between a pair of resilient lugs extending rearwardly from said rear side; and
said ring-like member also having mounted thereon a recharging socket electrically connected to said batteries to enable the latter to be recharged, said recharging socket being disposed on a diametrically opposite side of said ring-like member to said actuating button.

17. The electrical appliance of claim 16, wherein:
said electrical appliance is a hand-held vacuum cleaner;
said rotatable driven member comprises a suction turbine;
said support block has a generally flat shape defined by forward and rear faces thereof, said faces being perpendicular to a rotational axis of said shaft;
said sleeve and said ring-like member are coaxial with said rotational axis;
each said battery has a longitudinal axis, said batteries being disposed around said motor with the longitudinal axis of each battery being spaced radially outwardly from and perpendicular to said rotational axis;
said fasteners comprise studs engaged in sockets, said studs and sockets having axes parallel to said rotational axis; and
the lugs of each said pair of lugs are resiliently movable apart in a direction perpendicular to said rotational axis.

18. A functional unit for mounting in a housing of an electrical appliance, said functional unit comprising:
a support block, an electric motor, a rotatable driven member, a plurality of rechargeable batteries, and a ring-like member connected together as a structurally and functionally independent unit ready for insertion into said appliance housing;
said rotatable driven member being a press fit on an extension of a rotatable output shaft of said motor, said extension extending through an aperture in said support block with said motor on a rear side of said block and said driven member on a forward side of said block;
said support block having a generally flat shape defined by forward and rear faces thereof, said faces being perpendicular to a rotational axis of said output shaft;
a sleeve extending rearwardly from said rear face and being formed integrally with said support block;
said ring-like member abutting a rear end of said sleeve and being secured by fasteners to said block;
said fasteners comprising interengaging studs and sockets extending parallel to said rotational axis, said studs being integral with said ring-like member and said sockets being formed in said support block;
said motor being engaged through said ring-like member and frictionally engaged in said sleeve with a forward end of said motor abutting said rear face;
said ring-like member having mounted thereon an on/off switch for said motor, said switch having a resiliently mounted actuating button depressable towards said ring-like member for actuation of said switch;
said batteries being mounted on said rear face and being electrically connected to said motor via said switch, each battery being held between a pair of resilient lugs integral with said support block and extending rearwardly from said rear face;
each said pair of lugs having rear free ends which are resiliently movable apart in a direction perpendicular to said rotational axis, said rear free ends having portions turned inwards towards each other;
said batteries having longitudinal axes disposed perpendicular to said rotational axis, and said batteries being connected in series in a U-shaped arrangement around said sleeve;
said ring-like member also having mounted thereon a recharging socket electrically connected to said batteries to enable the latter to be recharged, said recharging socket being disposed on an opposite side of said rotational axis to said actuating button; and
said support block, said sleeve, and said lugs being integrally molded from electrically insulating plastic material.

* * * * *